(12) United States Patent
Reigo et al.

(10) Patent No.: US 10,782,705 B2
(45) Date of Patent: *Sep. 22, 2020

(54) OBSTACLE DETECTION FOR A ROBOTIC WORKING TOOL

(71) Applicant: HUSQVARNA AB, Huskvarna (SE)

(72) Inventors: Peter Reigo, Djursholm (SE); Ludvig Sjöholm, Gränna (SE)

(73) Assignee: HUSQVARNA AB, Huskvarna (SE)

( * ) Notice: Subject to any disclaimer, the term of this patent is extended or adjusted under 35 U.S.C. 154(b) by 21 days.

This patent is subject to a terminal disclaimer.

(21) Appl. No.: 16/215,123

(22) Filed: Dec. 10, 2018

(65) Prior Publication Data

US 2019/0113923 A1   Apr. 18, 2019

Related U.S. Application Data

(63) Continuation of application No. 15/105,013, filed as application No. PCT/SE2013/051574 on Dec. 19, 2013, now Pat. No. 10,185,325.

(51) Int. Cl.
*G05D 1/02* (2020.01)
*A01D 34/00* (2006.01)
(Continued)

(52) U.S. Cl.
CPC ............ *G05D 1/028* (2013.01); *A01D 34/008* (2013.01); *A01D 75/185* (2013.01); *B60L 1/003* (2013.01);
(Continued)

(58) Field of Classification Search
CPC ............ G05D 1/028; G05D 1/0255; G05D 2201/0203; G05D 2201/0208; A01D 34/008; A01D 75/185; A47L 2201/04; Y02T 90/162; Y02T 10/645; B60L 2200/40; B60L 2260/32; B60L 2240/62
See application file for complete search history.

(56) References Cited

U.S. PATENT DOCUMENTS 5,703,464 A   12/1997   Karunasiri et al.
6,005,367 A   12/1999   Rohde
(Continued)

FOREIGN PATENT DOCUMENTS

CN   201515238 U   6/2010
CN   102142186 A   8/2011
(Continued)

OTHER PUBLICATIONS

International Search Report and Written Opinion for International Application No. PCT/SE2013/051574, dated Oct. 13, 2014.
(Continued)

*Primary Examiner* — Michael J Zanelli
(74) *Attorney, Agent, or Firm* — Burr & Forman LLP

(57) ABSTRACT

A robotic work tool system (200) comprising a robotic work tool (100) and a beacon marker (280), said robotic work tool (100) comprising a beacon sensor (175) configured to sense a signal being transmitted by the beacon marker (280), said beacon marker (280) marking an area (270) around an obstacle (260) in a work area (205) in which said robotic work tool (100) is arranged to operate, wherein said robotic work tool is configured to determine a proximity to a beacon marker (280) and to adapt its operation accordingly.

15 Claims, 2 Drawing Sheets

(51) Int. Cl.
*A01D 75/18* (2006.01)
*B60L 1/00* (2006.01)
*B60L 8/00* (2006.01)
*B60L 15/20* (2006.01)
*B60L 50/52* (2019.01)
*B60L 50/16* (2019.01)
*B60L 53/14* (2019.01)
*B60L 53/30* (2019.01)

(52) U.S. Cl.
CPC ........... *B60L 8/003* (2013.01); *B60L 15/2036* (2013.01); *B60L 50/16* (2019.02); *B60L 50/52* (2019.02); *B60L 53/14* (2019.02); *B60L 53/30* (2019.02); *G05D 1/0255* (2013.01); *A47L 2201/04* (2013.01); *B60L 2200/40* (2013.01); *B60L 2220/46* (2013.01); *B60L 2240/423* (2013.01); *B60L 2240/62* (2013.01); *B60L 2260/32* (2013.01); *G05D 2201/0203* (2013.01); *G05D 2201/0208* (2013.01); *Y02T 10/645* (2013.01); *Y02T 10/70* (2013.01); *Y02T 10/7005* (2013.01); *Y02T 10/7072* (2013.01); *Y02T 10/7077* (2013.01); *Y02T 10/7083* (2013.01); *Y02T 10/72* (2013.01); *Y02T 10/7275* (2013.01); *Y02T 10/7291* (2013.01); *Y02T 90/121* (2013.01); *Y02T 90/14* (2013.01); *Y02T 90/16* (2013.01); *Y02T 90/162* (2013.01)

(56) References Cited

U.S. PATENT DOCUMENTS

| | | |
|---|---|---|
| 6,671,592 B1 | 12/2003 | Bisset et al. |
| 6,674,687 B2 | 1/2004 | Zeitzew |
| 6,913,087 B1 | 7/2005 | Brotto et al. |
| 7,119,516 B2 | 10/2006 | Denning |
| 7,953,526 B2 | 5/2011 | Durkos et al. |
| 8,027,761 B1 | 9/2011 | Nelson |
| 8,169,298 B2 | 5/2012 | Wiesner et al. |
| 8,319,475 B2 | 11/2012 | Choksi et al. |
| 8,390,246 B2 | 3/2013 | Taguchi et al. |
| 8,752,645 B2 | 6/2014 | Liebhard |
| 2002/0086718 A1 | 7/2002 | Bigwood et al. |
| 2003/0034757 A1 | 2/2003 | Woodnorth |
| 2003/0122523 A1 | 7/2003 | Hyun-Jun et al. |
| 2005/0120505 A1 | 6/2005 | Takao |
| 2005/0163309 A1 | 7/2005 | Kim |
| 2007/0182576 A1 | 8/2007 | Proska et al. |
| 2007/0244610 A1 | 10/2007 | Ozick et al. |
| 2008/0058987 A1 | 3/2008 | Ozick et al. |
| 2008/0150474 A1 | 6/2008 | Ball et al. |
| 2008/0276407 A1 | 11/2008 | Schnittman et al. |
| 2010/0141483 A1 | 6/2010 | Thacher et al. |
| 2010/0156660 A1 | 6/2010 | Lee et al. |
| 2010/0222926 A1 | 9/2010 | Chiu |
| 2011/0023130 A1 | 1/2011 | Gudgel et al. |
| 2012/0166847 A1 | 6/2012 | Noda et al. |
| 2012/0187851 A1 | 7/2012 | Huggins et al. |
| 2012/0235628 A1 | 9/2012 | Okabayashi et al. |
| 2013/0041526 A1 | 2/2013 | Ouyang |
| 2013/0109375 A1 | 5/2013 | Zeiler et al. |
| 2013/0147436 A1 | 6/2013 | Fukumoto |
| 2013/0148283 A1 | 6/2013 | Forutanpour et al. |
| 2013/0261867 A1 | 10/2013 | Burnett et al. |
| 2014/0000922 A1 | 1/2014 | Pellenc |
| 2014/0035357 A1 | 2/2014 | Hausman et al. |
| 2014/0107853 A1 | 4/2014 | Ashinghurst et al. |
| 2014/0151079 A1 | 6/2014 | Furui et al. |
| 2014/0159919 A1 | 6/2014 | Furui et al. |
| 2014/0167676 A1 | 6/2014 | Juergen |
| 2014/0210265 A1 | 7/2014 | Thorsoe |
| 2014/0240125 A1 | 8/2014 | Burch et al. |
| 2014/0292245 A1 | 10/2014 | Suzuki et al. |
| 2014/0312848 A1 | 10/2014 | Alexander et al. |
| 2014/0342193 A1 | 11/2014 | Mull et al. |
| 2015/0042291 A1 | 2/2015 | Racine et al. |
| 2015/0091698 A1 | 4/2015 | Du |
| 2015/0214758 A1 | 7/2015 | Toya et al. |
| 2015/0316913 A1 | 11/2015 | Rickey et al. |
| 2017/0127501 A1 | 5/2017 | Isaacs et al. |

FOREIGN PATENT DOCUMENTS

| | | |
|---|---|---|
| CN | 103000826 A | 3/2013 |
| CN | 104395770 A | 3/2015 |
| EP | 2267568 A2 | 12/2010 |
| EP | 2256572 B1 | 1/2013 |
| GB | 2358843 A | 8/2001 |
| JP | 2009-259023 A | 11/2009 |
| WO | 99/59042 A1 | 11/1999 |
| WO | 00/38029 A1 | 6/2000 |
| WO | 01/42867 A1 | 6/2001 |
| WO | 2007/058596 A1 | 5/2007 |
| WO | 2014/167403 A1 | 10/2014 |
| WO | 2014/167889 A1 | 10/2014 |
| WO | 2015/061370 A1 | 4/2015 |

OTHER PUBLICATIONS

International Preliminary Report on Patentability for International Application No. PCT/SE2013/051574 dated Jun. 21, 2016.
International Search Report and Written Opinion for International Application No. PCT/IB2016/055776, dated Jan. 5, 2017.
International Preliminary Report on Patentability for International Application No. PCT/IB2016/055776 dated Apr. 3, 2018.

OBSTACLE DETECTION FOR A ROBOTIC WORKING TOOL

CROSS-REFERENCE TO RELATED APPLICATIONS

This application is a Continuation of U.S. application Ser. No. 15/105,013, filed Jun. 16, 2016, which is a U.S. National Stage Entry of PCT/SE2013/051574 filed Dec. 19, 2013, the entire contents of both are hereby incorporated by reference.

TECHNICAL FIELD

This application relates to a method and a robotic work tool system for an improved navigation for a robotic work tool. And in particular to an improved detection of obstacles.

BACKGROUND

Contemporary robotic work tools are becoming more and more advanced and are able to perform more and more advanced tasks such as executing advanced operation patterns. In the example of lawnmower robots the advanced working pattern may be a complicated mowing pattern based on the layout of a garden including bushes, garden islands and other structures. To successfully navigate such complicated areas some contemporary robotic work tools employ various navigation techniques three of the main being deduced reckoning (also known as dead reckoning), satellite navigation or using boundary wires.

One factor that complicates the working pattern is the presence of different obstacles or structures inside a working area. For the example of the robotic work tool being a lawnmower robot and the work area being a garden, the obstacles may be bushes and trees and the structures may be a porch or a shed.

Such structures are usually fixed or permanent and will not change over time and can thus be marked with a boundary marker such as a boundary wire that transmits an electric current that is detected by the robotic work tool. Alternatively they can be marked in a map of the work area and the robotic work tool includes the coordinates of such structures in its operating pattern so that the structures are avoided. Such technologies are well known in the art.

However, obstacles may change over time and may also not always be present. For example, a user may dig a hole in his garden for example to service some pipes and this hole would not be a permanent feature of the garden. Furthermore, the user may want that one area should not be serviced at a specific time such as when a child is playing in one corner of the garden. Such areas will hereafter be referred to as temporary or virtual obstacles.

To mark such obstacles with prior art technologies is cumbersome as it requires that boundary wires are dug down or that the map is reprogrammed. Something which can be cumbersome to a user, especially if the obstacle will only be present for a short time.

The international patent application WO99/59042A discloses a robotic system for systematically moving about an area to be covered. The system includes at least one boundary marker located along the outer edge of the area to be covered, a robot with a navigation system and a sensor unit. The navigation system navigates the robot in generally straight, parallel lines from an initial location and turns the robot when the robot encounters one of the boundary markers, thereby to systematically move about the area to be covered. The sensor unit senses proximity to one of the at least one boundary marker. The system may further comprise obstacle markers that are also sensed by the robot.

The disclosure teaches on page 7; lines 17 to 20 that obstacles that are above ground may be detected by mere collision detection, whereby the obstacle itself is the obstacle marker and the sensing is the collision detection. This will increase the wear and tear of a robotic work tool as it will be subjected to numerous collisions. Furthermore, such detection is highly unsuitable for virtual obstacles.

The disclosure also teaches on page 9 that the obstacle markers are wires and a manner of differentiating between obstacle markers and boundary markers is given. As has been discussed above, such wires need to be dug down in the ground and as such require much work to be done which may be especially cumbersome if it is only for a temporary marker.

The disclosure further teaches on page 10 that the obstacle markers may be a post having a bar code written on it which is detected through a bar code reader. Such barcodes must therefore be visually detected which limits the placement, the distance/size of the (virtual) obstacle and the arrangement is also sensitive to debris blocking the barcode reader's lens.

Even though the problems above have been discussed for lawnmower robotic work tools, the same or similar problems exist also for other robotic work tools.

There is thus a need for a manner of enabling indicating obstacles, that is easy to install, is not sensitive to debris or waste, and does not increase the wear and tear of a robotic work tool.

SUMMARY

It is an object of the teachings of this application to overcome the problems listed above by providing a robotic work tool system comprising a robotic work tool and a beacon marker, said robotic work tool comprising a beacon sensor configured to sense a signal being transmitted by the beacon marker, said beacon marker marking an area around an obstacle in a work area in which said robotic work tool is arranged to operate, wherein said robotic work tool is configured to determine a proximity to a beacon marker and to adapt its operation accordingly.

In one embodiment the robotic work tool is a farming equipment, a vacuum cleaner, a floor cleaner, a street sweeper, a snow removal tool, a golf ball retriever robot, a cleaner robot, a leaves blower robot, a leaves collector robot, snow thrower robot or a mine clearance robot.

It is also an object of the teachings of this application to overcome the problems listed above by providing a method for use in a robotic work tool system comprising a robotic work tool and a beacon marker, said robotic work tool comprising a beacon sensor configured to sense a signal being transmitted by the beacon marker, said beacon marker marking an area around an obstacle in a work area in which said robotic work tool is arranged to operate, said method comprising determining a proximity to a beacon marker and adapt an operation of the robotic work tool accordingly.

The inventors of the present invention have realized, after inventive and insightful reasoning that by arranging a beacon (radio frequency or ultrasonic) to be placed on an or close to obstacle, a simple and effective manner of marking an obstacle is achieved. The obstacle marker will uniformly mark most objects, especially such that occur in everyday scenarios and especially with regards to temporary obstacles, and enable a radius to be effectively set by a user by setting the strength of the signal transmitted by the beacon.

Furthermore, such beacon markers may be easily arranged on for example a pole or stick which can easily be driven into the ground to mark a virtual obstacle or a hole.

A problem that exists in using radio Frequency Identification technology (RFID) is that an RFID tag can not be used to set a radius easily. Furthermore, the RFID tag is only arranged to operate at short distances without requiring that a sensor on a robot is used at high power, which of course would severely limit the operation of the robotic work tool.

Furthermore, this would result in an increased interference in a work area, which can be very disturbing in for example a residential neighbourhood.

Also, RFID tags can not indicate a distance, such as by reflecting a transmitted signal. Using RFID technology thus provide a more complicated solution that requires that more power is used, increases the interference and can not provide all the functionality of using a beacon based system as disclosed herein.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
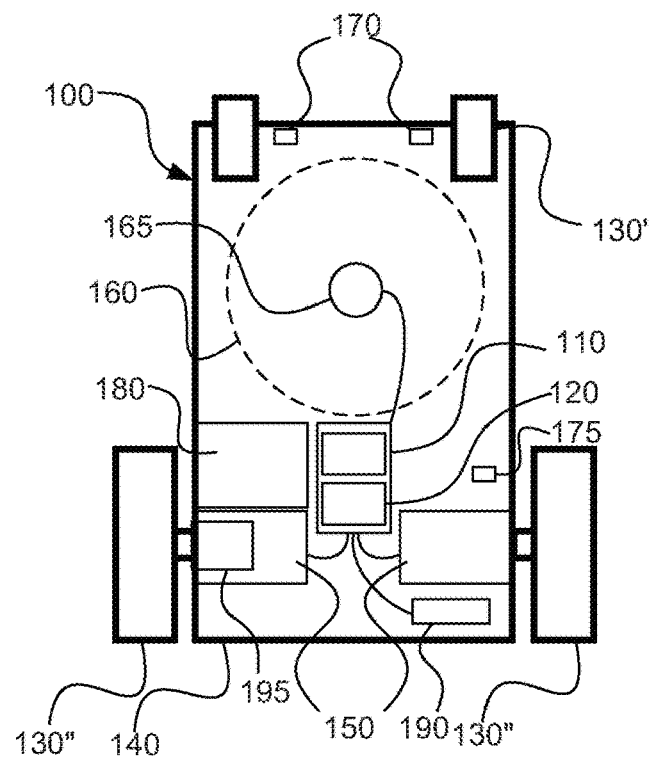
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focussed on electric motors, combustion engines may alternatively or additionally be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 further may have at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

It should be noted that the teachings herein may also be used for a robotic work tool that is configured to operate in a work area, where the work area is not bounded by a boundary wire. Examples of such robotic work tools are tools arranged to physically detect a boundary by collision detection, or a robotic work tool that uses a position determination system (such as GNSS) to maintain a position within the work area, which work area is specified by coordinates.

The robotic work tool 100 may also or alternatively be arranged with a position determining device 190, such as a GNSS (Global Navigation Satellite System) device 190. In one embodiment the GNSS device is a GPS (Global Positioning Service) device 190. The GNSS device 190 is connected to the controller 110 for enabling the controller 110 to determine a current position for the robotic work tool 100 using the GNSS device and to control the movements of the robotic work tool 100 based on the position.

Alternatively, the robotic work tool 100 may be arranged to operate within the work area solely or mainly based on the position determining device 190. A user may then establish a work area through coordinates and the robotic work tool will ensure that it stays within those coordinates based on the signals received by the position determining device 190.

Other examples of position determining devices 190 include optical (such as laser) position determining devices, other radio frequency position determining systems, such as ultrawideband (UWB) beacons and receivers.

The robotic work tool 100 may further be arranged with at least one sensor 195 for providing signals for deduced reckoning navigation. Examples of such deduced reckoning navigation sensors 195 are odometers, accelerometers, gyroscopes and compasses.

The deduced reckoning sensor(s) may be used to navigate in areas where satellite reception is not possible, i.e. areas hereafter referred to as shadowed areas.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller is also configured to determine the load exerted on the rotating blade, by for example measure the power delivered to the cutter motor 165 or by measuring the axle torque exerted by the rotating blade. The robotic work tool 100 is, in one embodiment, a lawnmower robot. In one embodiment the robotic work tool 100 is a farming equipment. In one embodiment the robotic work tool 100 is a golf ball collecting tool.

The robotic work tool 100 may also be a vacuum cleaner, a floor cleaner, a street sweeper, a snow removal tool, a mine clearance robot or any other robotic work tool that is required to operate in a work area in a methodical and systematic or position oriented manner.

The robotic work tool 100 also has (at least) one battery 180 for providing power to the motors 150 and the cutter motor 165. Alternatively or additionally the robotic work tool may have a fuel tank 180 for supplying fuel to any other type of engine 150. In one embodiment the robotic work tool is arranged with solar panel for supplying power to the battery 180.

Figure 2:
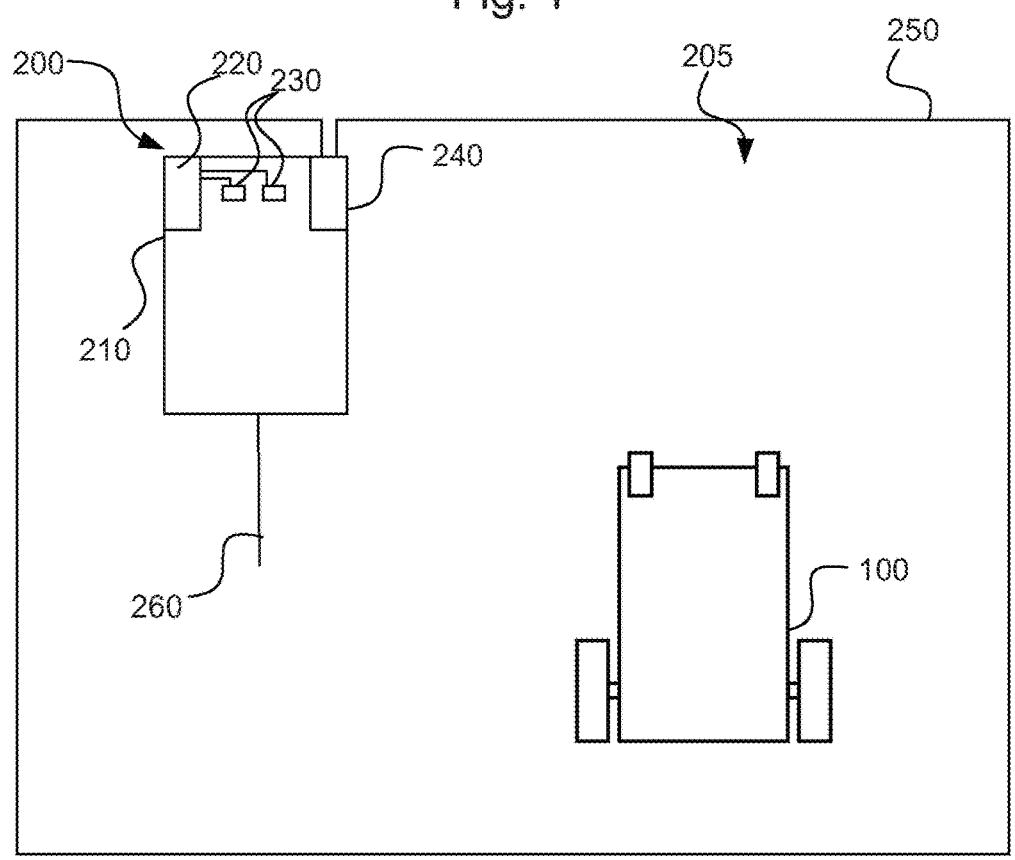
FIG. 2 shows a schematic view of a robotic working tool system according to one embodiment of the teachings of this application.

FIG. 2 shows a schematic view of a robotic work tool system 200 comprising a charging station 210 and a boundary wire 250 arranged to enclose a working area 205, the working area 205 not necessarily being a part of the robotic work tool system 200, in which the robotic work tool 100 is supposed to service. As stated above, the robotic work tool 100 may be arranged to operate solely using the position determining device in which case no boundary wire 250 nor signal generator (to be disclosed) is part of the system 200. The charging station 210 has a charger 220 coupled to, in this embodiment, two charging plates 230. The charging plates 230 are arranged to co-operate with corresponding charging plates (not shown) of the robotic work tool 100 for charging the battery 180 of the robotic work tool 100. The charging station 210 also has, or may be coupled to, a signal generator 240 for providing a control signal (not shown) to be transmitted through the boundary wire 250. As is known in the art, the control signal will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed. The use of more than one sensor 170 enables the controller 110 of the robotic work tool 100 to determine how the robotic work tool 100 is aligned with relation to the boundary wire 250 by comparing the sensor signals received from each sensor 170. This enables the robotic work tool to follow the boundary wire 250, for example when returning to the charging station 210 for charging.

Optionally, the charging station 210 also has a guide cable 260 for enabling the robotic work tool to find the entrance of the charging station 210. In one embodiment the guide cable 260 is formed by a loop of the boundary wire 250. In one embodiment the guide wire 260 is used to generate a magnetic field for enabling the robotic work tool 100 to find the charging station without following a guide cable 260.

Figure 3:
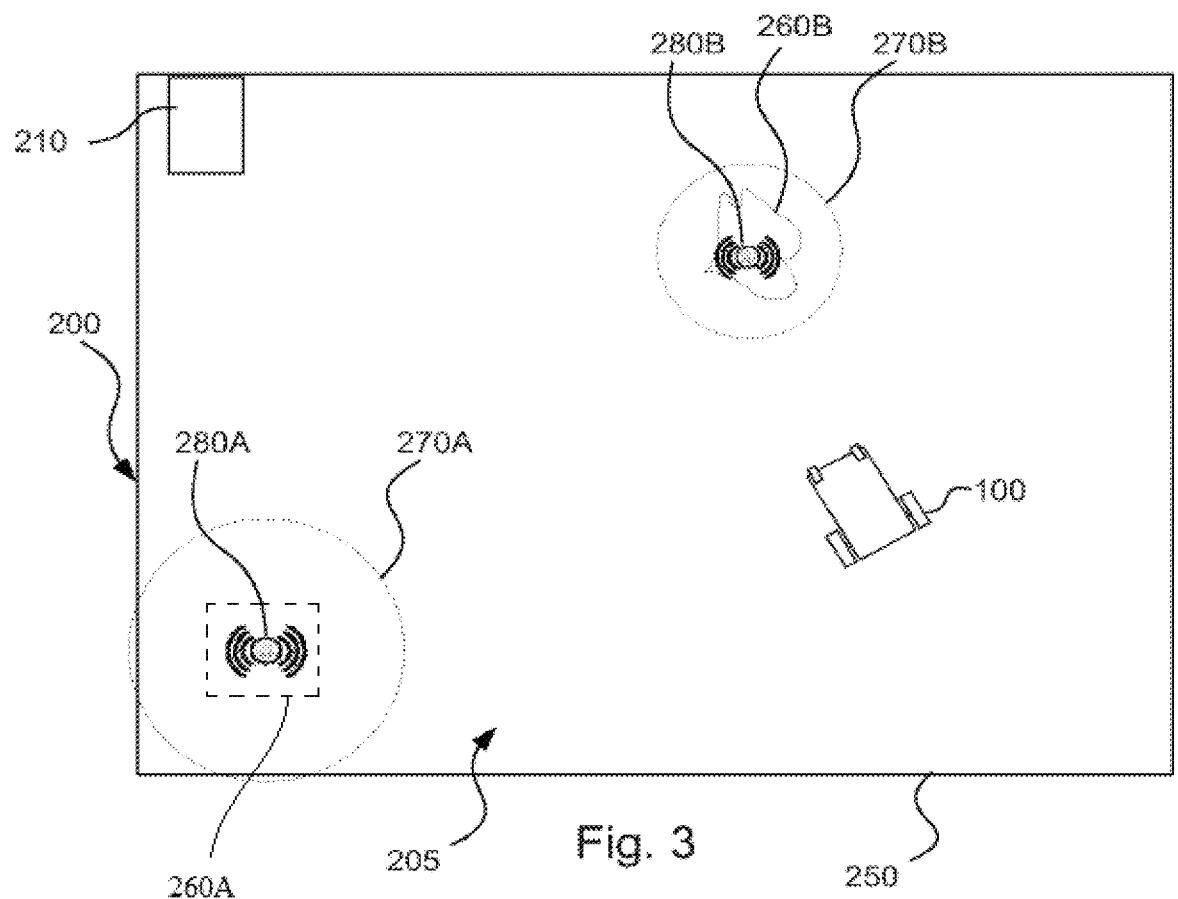
FIG. 3 shows a schematic view of a robotic working tool system in operation according to one embodiment of the teachings of this application.

FIG. 3 shows another schematic view of a robotic work tool system 200 according to the teachings herein, such as the robotic work tool system 200 of FIG. 2, being depicted here at a larger scale.

The work area 205 is shown here to include two obstacles 260 and being delimited by a boundary 250. It should be noted that there may be more or less than two obstacles 260.

The boundary 250 may be effected through navigation coordinates or a boundary wire or other suitable means for defining a boundary for a work area for robotic work tools.

Two obstacles 260A and 260B are shown in the example embodiment of FIG. 3, one obstacle being a virtual obstacle 260A and one being an actual obstacle 260B. An obstacle marker in the form of a beacon marker 280 is arranged on or in each obstacle 260. The beacon markers 280 emit each a signal that marks an area 270 around the obstacle 260. As can be seen in FIG. 3, the areas 270 may be of different size/radius. The area 270A for the virtual obstacle 260A being larger than the area 270B for the physical obstacle 260B. It should be noted that the area 270 of a beacon marker 280 may be regulated and possibly user settable by increasing or decreasing the signal power, or by programming the robotic work tool to detect a signal at a certain strength. The size relationship of the areas 270 in FIG. 3 are only examples and any internal relationship of sizes is possible and within the scope of this application.

As a robotic work tool 100 comes close to a beacon marker 280 it will detect a signal transmitted by the beacon marker 280 through a beacon sensor 175 arranged in the robotic work tool (see FIG. 1). The beacon sensor 175 is coupled to the controller 110 for determining the proximity to the beacon marker 280. Alternatively the beacon sensor 175 is arranged to determine the proximity to the beacon marker 280 by itself and signal that a beacon marker is close by to the controller as the proximity of a beacon marker 280 is determined.

In one embodiment the robotic work tool 100 is configured to determine the proximity to a beacon marker by comparing the signal strength (SSI) of the beacon signal, or a radio signal strength indicator (RSSI) of the beacon signal.

In one embodiment the robotic work tool 100 is configured to determine the proximity to a beacon marker as a state close or not close by comparing the signal strength of the beacon signal to a threshold value. If the signal strength is above the threshold value, the beacon is close, and, if not, it is not close.

In one embodiment the robotic work tool 100 is configured to determine the proximity to a beacon marker by comparing the signal strength of the beacon signal to a model of signal declination. In this embodiment the robotic work tool 100 is configured to know at what signal strengths the beacon signal is transmitted. This enables for determining a more precise distance to the beacon marker 280 and the robotic work tool 100 may take different actions depending on the actual distance. Such different actions may be to slow down or make a turn less than 180 degrees depending on the distance. For example, the robotic work tool may be configured to slow down if the distance is 5 m, to turn 90 degrees if the distance is 2 m, and to turn 180 degrees if the distance is less than 1 m.

In one embodiment the robotic work tool 100 is configured to determine the proximity to a beacon marker by sending a signal to the beacon and measure the two-way response time or alternatively phrased to measure the time of arrival (TOA).

In one embodiment the robotic work tool 100 is configured to determine the proximity to a beacon marker as a state close or not close by comparing the two-way response to a threshold value. If the two-way response is above the threshold value, the beacon is close, and, if not, it is not close.

In one embodiment the robotic work tool 100 is configured to determine a more precise distance to the beacon marker 280 based on the two-way response. This enables for determining a more precise distance to the beacon marker 280 and the robotic work tool 100 may take different actions depending on the actual distance. Such different actions may be to slow down or make a turn less than 180 degrees depending on the distance. For example, the robotic work tool may be configured to slow down if the distance is 5 m, to turn 90 degrees if the distance is 2 m, and to turn 180 degrees if the distance is less than 1 m.

In one embodiment the beacon marker 280 and the beacon sensor 175 are synchronized wherein the robotic work tool 100 need not transmit a signal to the beacon marker 280, but merely measures the time of arrival from a known last transmission time. Such an embodiment may operate in a manner similar to measure the two-way response time.

Figure 4:
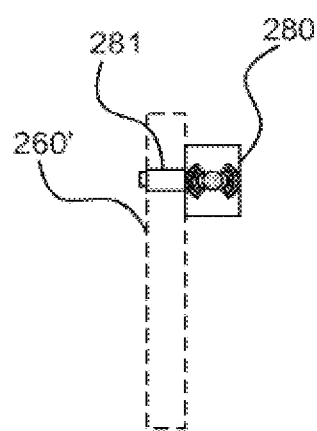
FIG. 4 shows a schematic view of a beacon marker according to one embodiment of the teachings of this application.

FIG. 4 shows a schematic view of a beacon marker 280. The beacon marker 280 is arranged to be fastened to an obstacle or a pole 260' (indicated with dashed lines). The beacon marker 280 may be fastened through various fastening means 281, such as, but not limited to, straps, belts, adhesive tape, Velcro™ to name a few examples.

In one embodiment the beacon marker 280 is a radio frequency beacon emitting a radio frequency signal and the beacon sensor 175 is a radio frequency receiver (or transceiver).

In one embodiment the beacon marker 280 is an ultrasonic beacon emitting an ultrasonic signal and the beacon sensor 175 is an ultrasonic receiver (or transceiver).

This has one benefit in that an obstacle 260 is simple to mark by simply arranging a beacon marker on or adjacent to the obstacle 260. This is especially so for virtual obstacles 260A.

This finds particular use in setting up temporary working areas, something of importance for robotic work tools 100 such as mine clearing robots. It is also useful in sensitive areas or areas having many holes and other hazards.

This also has the benefit of that it is easy to mark obstacles that are above ground at its outer perimeter, such as sun chairs. Robotic work tools 100 may otherwise become stuck under such obstacles if collision detection is used.

As has been stated above, collision detection increases the wear and tear of the robotic work tool 100, alternatively, the collision detection systems may be highly sensitive to dirt and debris and may become blocked rendering the collision detection inefficient.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An outdoor robotic work tool system comprising an outdoor robotic work tool and a beacon marker, said outdoor robotic work tool comprising a beacon sensor configured to sense a signal being transmitted by the beacon marker, said beacon marker marking an area around an obstacle in a work area in which said outdoor robotic work tool is arranged to operate, wherein said outdoor robotic work tool is configured to:

determine a proximity to the beacon marker and to adapt operation of the outdoor robotic work tool based on the proximity to the beacon marker.

2. The outdoor robotic work tool system according to claim 1, wherein the outdoor robotic work tool is further configured to determine the proximity to the beacon marker as a state of being close or not close by comparing a signal strength of the beacon signal to a threshold value, and if the signal strength is above the threshold value, the beacon marker is close, and, if not, the beacon marker is not close.

3. The outdoor robotic work tool system according to claim 1, wherein the outdoor robotic work tool is configured to determine the proximity to the beacon marker by comparing the signal strength of the beacon signal to a model of signal declination.

4. The outdoor robotic work tool system according to claim 1, wherein the outdoor robotic work tool is configured to determine the proximity to the beacon marker by sending a signal to the beacon marker and measuring a two-way response.

5. The outdoor robotic work tool system according to claim 4, wherein the outdoor robotic work tool is configured to determine the proximity to the beacon marker as a state of being close or not close by comparing the two-way response to a threshold value, and if the two-way response time is above the threshold value, the beacon marker is close, and, if not, the beacon marker is not close.

6. The outdoor robotic work tool system according to claim 4, wherein the outdoor robotic work tool is configured to determine a distance to the beacon marker based on the two-way response time.

7. The outdoor robotic work tool system according to claim 1, wherein the outdoor robotic work tool is configured to adapt its operation when determining a proximity to an obstacle by slowing down or making a turn less than 180 degrees.

8. The outdoor robotic work tool system according to claim 1, wherein the beacon marker and the beacon sensor are synchronized.

9. The outdoor robotic work tool system according to claim 1, wherein the outdoor beacon marker is a radio frequency beacon.

10. The outdoor robotic work tool system according to claim 9, wherein said beacon marker comprises fastening means for securing said beacon marker to an obstacle or a pole.

11. The outdoor robotic work tool system according to claim 1, wherein the beacon marker is an ultrasonic beacon.

12. The outdoor robotic work tool system according to claim 1, further comprising a position determining device is a Global Navigation Satellite System device.

13. The outdoor robotic work tool system according to claim 1, wherein the outdoor robotic work tool is a robotic lawnmower including a rotating blade driven by a cutter motor.

14. The outdoor robotic work tool system according to claim 1, wherein the outdoor robotic work tool is a farming equipment, a street sweeper, a snow removal tool, a golf ball retriever robot, a leaves blower robot, a leaves collector robot, snow thrower robot or a mine clearance robot.

15. A method for use in an outdoor robotic work tool system comprising an outdoor robotic work tool and a beacon marker, said outdoor robotic work tool comprising a beacon sensor configured to sense a signal being transmitted by the beacon marker, said beacon marker marking an area around an obstacle in a work area in which said outdoor robotic work tool is arranged to operate, said method comprising determining a proximity to a beacon marker and adapting an operation of the outdoor robotic work tool based on the proximity to the beacon marker.

* * * * *